March 27, 1928.  1,663,666
J. MOSKOVITZ ET AL
WINDSHIELD WIPER
Filed Oct. 30, 1925
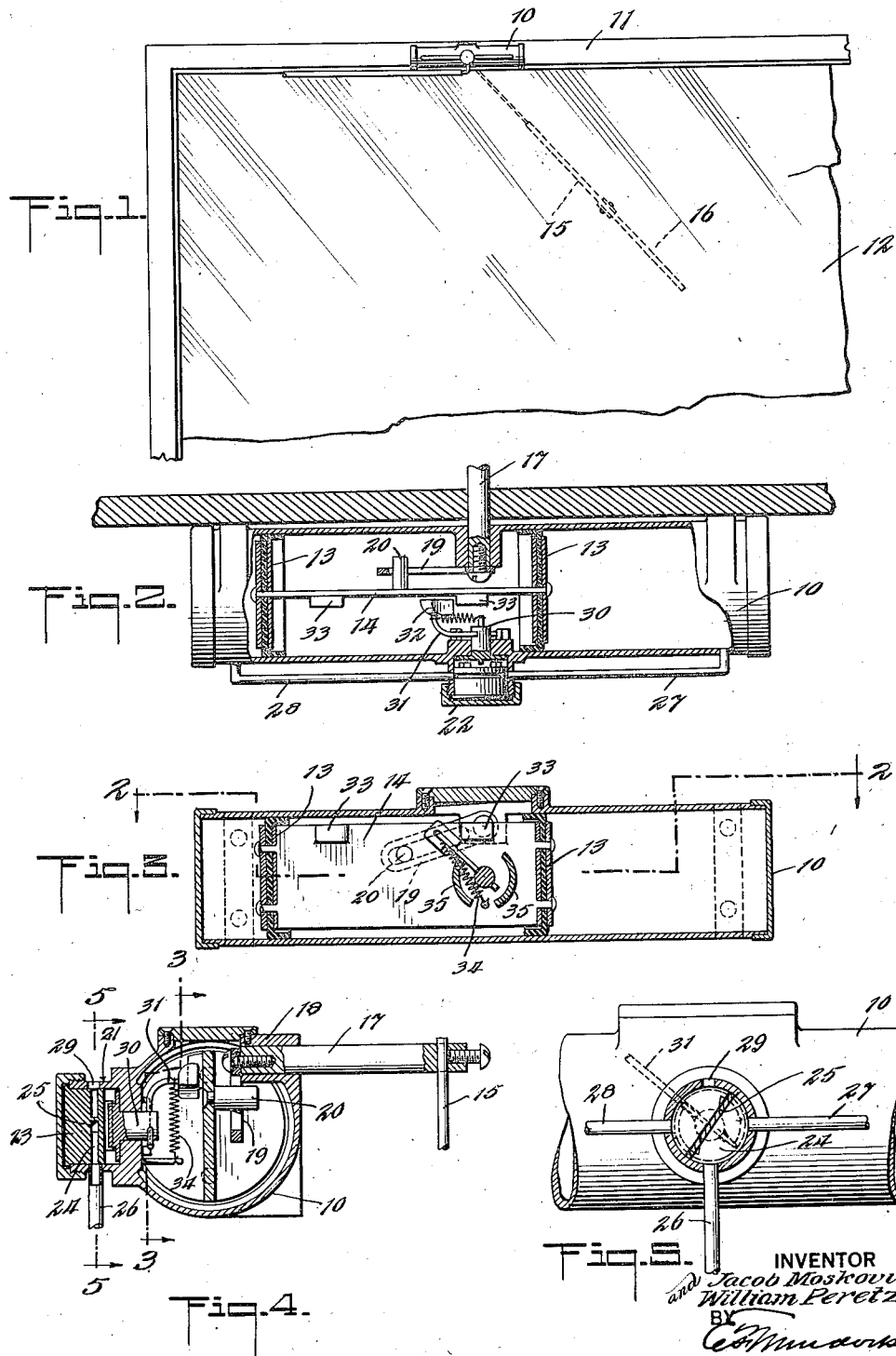
INVENTOR
Jacob Moskovitz
and William Peretz
BY
ATTORNEY Patented Mar. 27, 1928.

1,663,666

UNITED STATES PATENT OFFICE.

JACOB MOSKOVITZ, OF MIDDLE VILLAGE, AND WILLIAM PERETZ, OF NEW YORK, N. Y., ASSIGNORS TO MAXWELL EISENSTEIN, OF NEW YORK, N. Y.

WINDSHIELD WIPER.

Application filed October 30, 1925. Serial No. 65,766.

Among the principal objects which the present invention has in view are:—

To provide an improved and novel form of suction operated or vacuum type windshield wiper; to provide in a device of this character an automatic reversing valve for control of the wiper; to provide a vacuum operated windshield wiper having means for creating the vacuum alternately on opposite sides of an operating member; and generally to provide in a device of this character an improved and novel arrangement of structural elements.

Drawings.

Figure 1 is an elevation of a portion of a windshield frame equipped with a wiper;

Figure 2 is a fragmentary longitudinal section through a wiper substantially on the line 2—2 of Figure 3;

Figure 3 is a vertical longitudinal section through the wiper substantially on the line 3—3 of Figure 4;

Figure 4 is a transverse vertical section through the central portion of the wiper;

Figure 5 is a vertical section of the valve member taken on the line 5—5 of Figure 4.

Description.

In detail the invention comprises a cylindrical casing 10 adapted for being rigidly secured, as indicated in Figure 1, to the frame 11 of an automobile in any suitable manner, for action through the mechanism hereinafter described upon a windshield glass 12. Within the cylinder 10 is disposed a piston consisting of heads 13 spaced apart by a rigid vane 14 in the form of a flat strip rigidly connecting the piston heads 13 in spaced relation so that the heads and vane move as a unit for longitudinal reciprocation within the cylinder.

An arm 15 carrying at its lower end a wiper member 16 is rigidly secured at the end of a rock shaft 17 journalled through a bearing 18 formed in the cylinder wall and having rigidly attached to its inner end a slotted arm 19 disposed over a pin 20 projecting from one face of the vane 14 intermediate the piston heads. It is obvious that upon reciprocation of the piston within the cylinder, due to the engagement of the pin 20 within the slotted arm 19 the arm will be operated to rock the shaft 17 causing a corresponding oscillation of the wiper arm 15 to move the wiper 16 in an arc over the outer face of the windshield.

The operation of the wiper is controlled by the creation of a vacuum alternately at opposite ends of the piston, and for this purpose the wall of the cylinder has disposed thereon intermediate its ends a valve casing 21 of cylindrical formation having its outer end closed by a detachable cover 22 threaded thereover.

Within the casing 21 is mounted a rotatable valve plug 23 provided with a chamber 24 centrally divided by a partition 25. The valve chamber 24 is in communication with the intake manifold of an automobile engine through the medium of a conduit 26 extending through the casing 21, and in a similar manner communication is established between opposite ends of the cylinder 10 and the valve chamber 24 by means of conduits 27 and 28 extending from the valve casing to opposite ends of the cylinder. It will be apparent that upon suitable rotation of the valve plug 23 the partition 25 will be disposed in such manner that communication is alternately established between the manifold conduit 26 and one of the cylinder conduits such as 27 as shown in Figure 5 through the valve chamber 24 whereby a vacuum is created in one end of the cylinder, and between the manifold conduit and the other cylinder conduit 28 for alternate creation of a vacuum in the opposite end of a cylinder. The wall of the valve casing 21 is provided with a port 29 at a point diametrically opposite to the manifold conduit 26 so that atmospheric air is admitted through the valve chamber to the opposite end of the cylinder from that in which a vacuum is created.

The valve 23 is operated through the medium of a rock shaft 30 connected at one end with the valve plug and extending at its opposite end into the cylinder between the piston heads 13. The inwardly projecting end of the rock shaft 30 has rigidly attached thereto an arm 31 carrying at its end a shoe 32 adapted to be alternately engaged by laterally projecting spaced lugs 33 mounted on one face of the vane 14 of the piston. A positive and direct snap throw of the operating arm 31 is secured through the connection of a spring 34 from a point beneath the center of the shaft 30 to the end of the arm. Arcuate stop lugs 35 are formed internally on the wall of the cylinder to limit the throw of the arm 31 under the snap action imparted thereto by the spring. As can be seen from Figure 5, the valve partition 25 is oppositely inclined from the perpendicular but in the same degree, from the arm 31 so that as the arm is thrown in one direction the valve is operated immediately to create a vacuum in the end of the cylinder opposite that toward which the arm is thrown thereby imparting an automatic reversing action to the valve and assuring a constant reciprocation of the piston to the cylinder.

We claim:—

A windshield wiper comprising a cylinder, a double headed piston mounted for reciprocation within said cylinder, a vane connecting said piston heads rigidly in spaced relation, a pair of lugs projecting laterally from one side of said vane and in spaced relation longitudinally of the vane, a wiper arm extending through said cylinder and in operative connection with said vane on the side thereof opposite said lugs, a valve casing formed on one wall of said cylinder, an oscillatory valve plug in said casing, a stem on said plug and extending into said cylinder, said valve plug having passages formed therein, a partition in said plug dividing said passages, said valve casing having diametrically opposed ports in communication with the respective ends of said cylinder and one of said valve passages, said valve casing having a port intermediate said first named ports and in communication with a source of suction and one of said valve passages, an arm on said valve stem within said cylinder, a terminal shoe on said arm and disposed between said lugs on the piston vane.

JACOB MOSKOVITZ.
WILLIAM PERETZ.